United States Patent [19]

Hensing et al.

[11] Patent Number: 4,626,717
[45] Date of Patent: Dec. 2, 1986

[54] PIVOTABLY OSCILLATING MOTOR HAVING SIMPLE ARMATURE POLE ELEMENTS

[75] Inventors: Johannes M. M. Hensing, Eindhoven; Robert H. Munnig Schmidt, Drachten, both of Netherlands

[73] Assignee: U.S. Philips Corporation, New York, N.Y.

[21] Appl. No.: 707,324

[22] Filed: Mar. 1, 1985

[30] Foreign Application Priority Data

Mar. 13, 1984 [NL] Netherlands .......................... 8400791

[51] Int. Cl.⁴ ............................................ H02K 33/00
[52] U.S. Cl. ......................................... 310/36; 310/38
[58] Field of Search ......................... 310/15, 29, 36–39

[56] References Cited

U.S. PATENT DOCUMENTS 1,739,885  12/1929  Zbinder ............................ 310/37 X Primary Examiner—Donovan F. Duggan
Attorney, Agent, or Firm—David R. Treacy

[57] ABSTRACT

A pivotally oscillating motor having magnetizable armature pole elements arranged to cooperate with respective air gaps. Alternating current through a stator coil aids to the permanent magnet flux through one air gap while it reduces that in another air gap, so that alternately one or the other pole element is pivotally attracted into its respective air gap.

6 Claims, 6 Drawing Figures

PIVOTABLY OSCILLATING MOTOR HAVING SIMPLE ARMATURE POLE ELEMENTS

BACKGROUND OF THE INVENTION

The invention relates to a an oscillating motor comprising a magnetizable stator and a pivotally reciprocable armature and more particularly to such a motor provided with two coils which are arranged opposite each other and between which a magnetizable core extends, and a stator section provided with a magnet arranged parallel to the core. One of the magnet poles faces the core, and air gaps are formed between the stator and the core at those end faces of the coils which are remote from each other. Magnetizable pole elements of the armature are movable in the air gaps.

Such a motor is described in the article "Der schwingende Synchronlinearmotor mit Dauermagneten als Resonanz-Zugkrafterreger" in the magazine "Elektrotechnik und Maschinenbau", Jahrgang 96, Heft 10.

The known pivoting motor is constructed as a linear motor with two magnets and four mutually parallel air gaps. The pole elements of the armature are arranged in the air gaps and are movable along a straight path. In the operation condition the coils may be connected to an alternating-voltage source, the magnetic field thus produced in the coils cooperating with the permanent-magnetic field produced by the magnets. Under the influence of the magnetic forces which are then exerted on the sliding elements the armature can reciprocate linearly relative to the stator.

The armature of the known vibration motor is supported by elastic elements. Under operating conditions such a construction allows a movement of the armature in the transverse direction due to the retentive forces acting on the sliding elements. This has the drawback that the reciprocating motion of the armature is no longer perfectly linear and is not reproducible. Moreover, the clearance between the sliding elements and the stator and the core must be comparatively large in order to prevent the sliding elements from coming into contact with the stator and the core.

Therefore, the known pivoting motor is not suitable for uses in which the armature is required to follow exactly a predetermined path. For such uses complete control of the armature movement is necessary. The known motor must therefore be equipped with guide means for the armature. Guide means for linear motors are known per se, but such guide means, which generally comprise guide rods and linear bearing means, generally exhibit flexure under heavy loads. A linear oscillating motor provided with a known guide means provides satisfactory results only if the retentive forces are small. In the case of large retentive forces the requirements imposed on the armature movement cannot be very stringent. Moreover, in practice constructing a rectilinear guide mechanism for the armature with sufficient rigidity and suitable dimensions is found not to be a simple task due to the nature of the linear motor.

SUMMARY OF THE INVENTION

The invention aims at providing a vibration motor of the type specified in the opening paragraph so as to mitigate the problem of the armature supporting means.

According to the invention the vibration motor is characterized in that the pole elements follow a part of a circular path during their movement through the circularly arcuate air gaps, the armature being pivotable about a motor shaft.

The armature of a pivoting motor in accordance with the invention can be mounted on the motor shaft with a simple and cheap bearing arrangement, for example by means of rolling bearings, such as ball-bearings, which are known per se. Such bearings can readily take up the load caused by the retentive forces. This has the advantage that a motor in accordance with the invention can be very stable, the armature being capable of performing an accurately defined and reproducible movement.

In the operating condition the armature of a motor in accordance with the invention performs an oscillatory movement about the motor shaft, enabling the center position of the armature, the angular-displacement amplitude of the armature, and the frequency of the oscillatory movement of the armature to be controlled by, for example, an electronic control unit.

The aforementioned properties in combination with potentially high efficiency and high effective power can make a motor in accordance with the invention suitable for a wide variety of uses. For example, the motor may be used for driving control valves, reciprocating compressors, such as continuously variable compressors in refrigerators, and cutting members in shavers.

For constructional reaons a preferred embodiment of the invention is further characterized in that the motor shaft which carries the armature extends transversely with respect to the axis of the magnet and the common axis of the coils.

This or another embodiment is preferably further characterized in that a stator section provided with a magnet which cooperates with the core is situated opposite the stator section, the stator having recesses at the location of the pole elements. An advantage of this embodiment is that the motor can have a high efficiency and be capable of delivering a high effective power without the dimensions of the motor being affected significantly by the afore-mentioned steps.

This embodiment is preferably further characterized in that the armature comprises two pole elements which are each provided with a slot which extends parallel to the motor shaft. This can preclude unnecessary loss of flux due to magnetic short-circuits between the armature and the stator. Preferably, the core is also formed with recesses as the location of the sliding elements.

Yet another embodiment may be further characterized in that the armature comprises two armature sections which are pivotable independently of each other and which each comprise two sliding elements, the magnets being magnetized oppositely. In such a case the armature sections may be mounted on the same motor shaft and perform mutually opposite pivotal movements. An advantage of this embodiment is that two drive possibilities are available, which is favorable for specific uses, for example for driving a compressor comprising two pistons or for driving a shearing or cutting device.

Preferably, the sliding elements of the two-section armature are arranged in diametrically opposite pairs relative to the motor shaft. This has the advantage that mechanical vibrations in the motor system are minimized without the use of additional provisions such as counterweights.

This or another embodiment may be further characterized in that the movements of the pole elements of the armature are directed at least substantially transversely with respect to the common axis of the coils, the motor shaft being mounted centrally in the motor. This embodiment has the advantage that the dimensions can be small, so that the resulting motor can be particularly suitable for use in the small appliance. Moreover, small dimensions can lead to a reduction of the magnetic pathlengths and hence the magnetic losses.

The invention will now be described in more detail, by way of example, with reference to the drawing.

DESCRIPTION OF THE PREFERRED EMBODIMENTS

Figure 1:
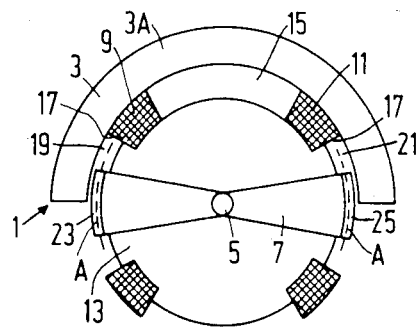
FIG. 1 shows diagrammatically a motor in accordance with the invention.

The motor in accordance with the invention which is shown diagrammatically in FIG. 1 bears the reference numeral 1 and comprises a magnetizable stator 3 and an armature 7 which is reciprocable about a motor shaft 5. The motor 1 further comprises two coils 9 and 11 (shown in cross-section for the sake of clarity), between which a magnetizable core 13 extends. A magnet 15 is arranged between the core 13 and a stator section 3A which extends parallel to the core, of which magnet one pole is positioned against the core 13 and the other pole against the stator section 3A. At the end faces 17 of the coils 9 and 11 which are remote from each other airgaps 19 and 21 are formed between the stator 3 and the core 13, in which air gaps pole elements 23 and 25 of the armature 7 are disposed. Since the armature 7 is pivotable about the motor shaft 5 the pole elements 23 and 25 follow a circular path during their movements, as is indicated by the broken line A, the centre of curvature of said path being situated on the axis of the motor shaft 5. The air gaps 19 and 21 have arcuate shapes in conformity with the shape of the path A.

When the coils 9 and 11 are energized, so that a suitable alternating current flows through the turns of the coils 9 and 11, an alternating magnetic field is produced around the coils 9 and 11, which field cooperates with the magnetic field produced by the magnet 15. The magnetic forces which then act on the pole elements 23 and 25 give rise to an oscillatory movement of the armature 7 about the motor shaft 5, the pole elements 23 and 25 being alternately drawn into the air gaps 19 and 21, respectively, by the magnetic forces.

Any retentive forces which may act between the pole elements 23 and 25 and the stator 3 with the core 13 are directed radially relative to the motor shaft 5 and can be taken up in a simple manner by means of a rotary bearing.

Some motors embodying the invention will be described with reference to FIGS. 2 to 6. Parts already mentioned in the above description of the principle of the motor bear the same reference numerals as in FIG. 1.

Figure 2:
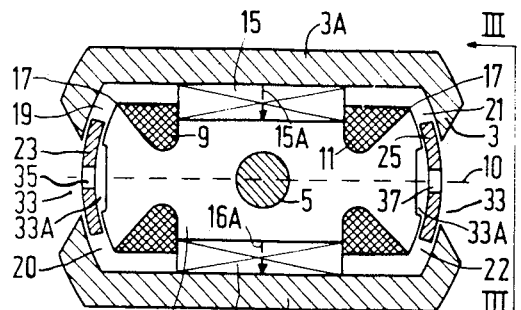
FIG. 2 is a sectional view of a first embodiment of the invention.
Figure 3:
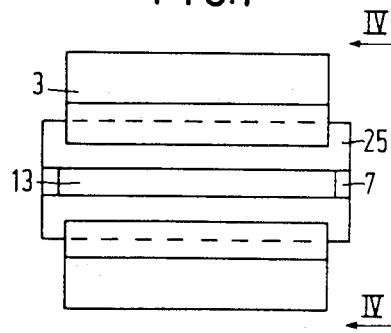
FIG. 3 shows the motor in a view taken on the lines III—III in FIG. 2.
Figure 4:
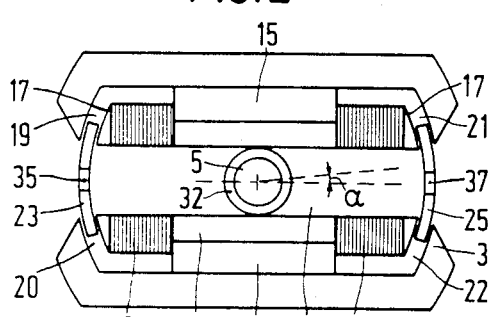
FIG. 4 shows the motor is a view taken on the lines IV—IV in FIG. 3.

FIGS. 2, 3 and 4 show a first embodiment. The motor 31 shown comprises two facing stator sections 3A and 3B of a stator 3, a magnet 15 being arranged between a ferromagnetic core 13 and the stator section 3A and a magnet 16 between the core 13 and the stator section 3B. The magnetic axis 16A of the magnet 16 is disposed in line with the magnetic axis 15A of the magnet 15. Two coils 9 and 11 are wound on the core 13, which coils have a common axis 10 which extends transversely with respect to the magnetic axes 15A and 16A. A motor shaft 5 which is mounted in the core 13 extends transversely with respect to the axes 10, 15A and 16A.

An armature 7 is pivotally mounted on the motor shaft 5 by means of a rotary bearing 32, known per se, and comprises two pole elements 23 and 25. At the location of the sliding elements 23 and 25 the stator 3 is formed with through-going recesses 33 which divide the stator into the two stator sections 3A and 3B which are spaced from each other. The recesses 33 serve to prevent magnetic short-circuits. In the present example the core 13 is formed with recesses 33A. It is obvious that the recesses 33 and 33A may be filled with a non-magnetizable material, such as a plastic material.

Near each of the end faces of the coils 9 and 11 which are remote from each other two circularly arcuate air gaps 19, 20 and 21, 22, respectively, are formed between the stator 3 and the core 13, in which gaps the respective pole elements 23 and 25 of the armature 7 are movable. The pole elements 23 and 25 each have a slot, 35 and 37 respectively, which extends parallel to the motor shaft 5 and which serves to preclude loss of magnetic flux.

In the drawing the armature 7 is shown in a central position. Under operating conditions the armature 7 in the present embodiment has a maximum angular displacement amplitude $\alpha$ of 7°.

Figure 5:
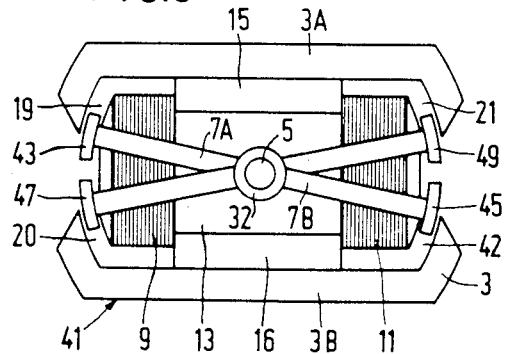
FIG. 5 shows a second embodiment of the invention.

FIG. 5 is an axial view of a second embodiment of the invention. In the same way as the preceding embodiment the motor 41 comprises a stator 3 with two stator sections 3A and 3B which are spaced from each other by recesses and between which a soft-iron core 13, a motor shaft 5, two coils 9 and 11, and two magnets 15 and 16 are arranged. Two air gaps 19, 20 and 21, 22 adjoin the coils 9 and 11 respectively.

In this second embodiment the magnets 15 and 16 are arranged in such a way that two like magnet poles face each other, i.e. the magnets 15 and 16 are magnetized in opposite directions. A two-section armature is mounted on the motor shaft 5, the armature sections 7A and 7B being pivotable independently of each other. The armature sections 7A and 7B may be mounted on the motor shaft 5 by means of a ball-race 32. Each of the armature sections 7A and 7B is provided with two pole elements, the pole elements 43 and 49 of the armature section 7A being movable in the air gaps 19 and 21, respectively and the sole elements 47 and 45 of the armature section 7B being movable in the air gaps 20 and 22, respectively.

When the coils 9 and 11 are energized the armature sections 7A and 7B move in opposite directions, which armature sections 7A and 7B may be coupled to a device to be driven, either independently or in combination.

In order to obtain a vibration-free motor counterweights may be used in order to ensure that the centers of gravity of the armature sections 7A and 7B are situated on the axis of the motor shaft 5.

Figure 6:
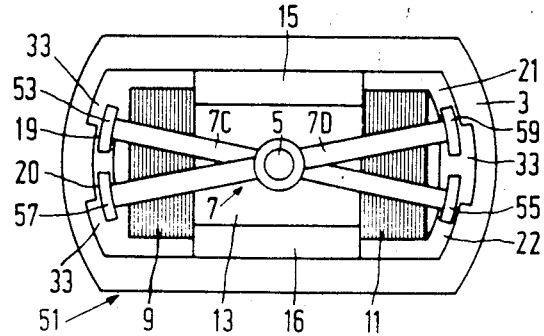
FIG. 6 shows a third embodiment.

FIG. 6 is an axial view of a third embodiment. In the same way as in the preceding embodiments the motor 51 comprises a stator 3, a core 13 with two coils 9 and 11, two magnets 15 and 16, four air gaps 19, 20 and 21, 22, and a motor shaft 5 which is mounted in the core 13 and which carries an armature.

The armature comprises two independently movable sections 7C and 7D which are each provided with two diametrically arranged pole elements 53, 55 and 57, 59, respectively. At the location of the pole elements 53, 55, 57 and 59 the stator 3 has recesses 33. The construction of the motor 51 in the present embodiment is asymmetrical, which is due to the non-symmetrical arrangement of the recesses 33. One of the recesses 33 is situated between the air gaps 21 and 22 and the two other recesses 33 are each situated on one side of the adjoining air gap 19 and 20, respectively.

In the same way as in the preceding embodiments, the magnets 15 and 16 are magnetized oppositely, so that under operating conditions the two armature sections 7C and 7D reciprocate in phase opposition about the motor shaft 5.

The special construction of the motor 51 results in a balanced symmetrical armature, so that counterweights may be dispensed with.

It is obvious that the scope of the invention is not limited to the embodiments described here.

What is claimed is:

1. A pivotally oscillating motor comprising a magnetizable stator and a reciprocable armature, said stator including two coils arranged opposite each other, and a magnetizable core extending between said coils; a stator section arranged to define a plurality of air gaps formed between the stator section and the core at end faces of the coils which are remote from each other, said air gaps being concentric about an axis; and at least one permanent magnet disposed between said stator section and said core with a magnet pole facing the core, said motor further comprising a motor shaft concentric with said axis, and an armature arranged to be pivotable about said shaft, said armature including a plurality of pole elements associated with respective air gaps, arranged such that pivoting of the armature causes one pole element to move into the respective air gap, and another pole element to move out of its respective air gap, said coils and core being arranged such that passage of an alternating current through the coils causes flux alternately to increase in a first of said air gaps and decrease in the second of said air gaps, and then to decrease in the first gap and increase in the second.

2. A motor as claimed in claim 1, characterized in that said axis is transverse to the direction of magnetization of the magnet, and said coils have a common axis parallel to the direction of magnet magnetization.

3. A motor as claimed in claim 1 or 2, characterized by comprising two said stator sections, each section defining respective first and second air gaps between the respective section and the core.

4. A motor as claimed in claim 3, characterized in that the armature comprises two pole elements, each having a slot extending parallel to the motor shaft.

5. A motor as claimed in claim 3, characterized in that the armature comprises two armature sections, pivotable independently of each other, each armature section comprising first and second pole elements; and said permanent magnets are magnetized opposite to each other.

6. A motor as claimed in claim 5, characterized in that the pole elements of a respective armature section are arranged diametrically opposite each other relative to the motor shaft.

* * * * *